Nov. 24, 1953
H. COOK
2,660,468
DEEP WELL FISHING TOOL
Filed July 28, 1949
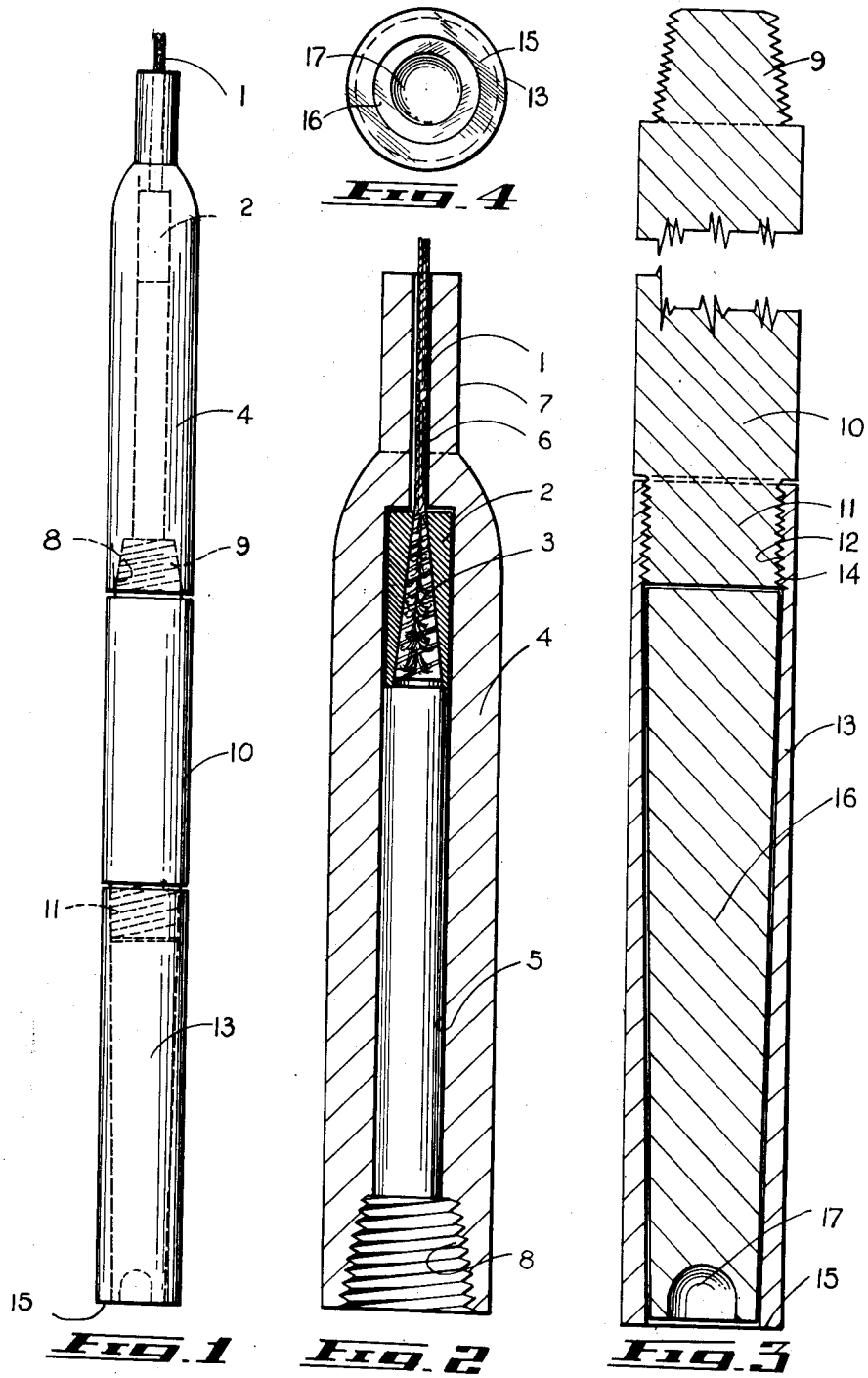
Inventor
HERBERT COOK
by *[signature]*
Attorney Patented Nov. 24, 1953

2,660,468

UNITED STATES PATENT OFFICE 2,660,468

DEEP WELL FISHING TOOL

Herbert Cook, Edmonton, Alberta, Canada

Application July 28, 1949, Serial No. 107,289

4 Claims. (Cl. 294—65.5)

This invention relates to improvements in a deep well fishing tool and appertains particularly to one employing a permanent magnet of novel and enhanced construction.

An object of the invention is to provide a magnetic fishing tool for deep well or other drill holes that will prove highly efficient in removing iron or steel particles such as damaged bits or broken parts thereof left in a hole or dropped in from the surface.

In all kinds of deep drilling, costly delays are occasioned if broken parts of bits or other metallic particles are lost in the hole. In such cases it is customary to core drill, substituting diamond drills for the regular type bits as the production zone is approached, that the operator may be kept informed of the porosity, oil saturation, thickness of zone and other characteristics of the area through which the drill is passing. As diamond bits are expensive, it is important that all steel fragments or the like be extracted from the hole before running the diamond bit to prevent damage thereto, before a core can be obtained.

Magnetic fishing tools heretofore known have proved of very limited usefulness since those employing the electromagnetic principle have not surmounted the difficulty of resistance of long leads, nor have those using permanent magnets produced one of reasonable dimensions with sufficient power or succeeded in offsetting the drag of the highly magnetized casing. Another difficulty with fishing tools has been that those run in on ordinary drill rod or pipe, as used on a standard rotary rig, take a long time to raise and lower and, even if successful in recovering all the iron and steel fragments, may waste a whole day for an entire work crew.

It is a particular object of my invention to provide a permanent type magnet fishing tool of any desired diameter and capacity that can remove all iron, steel or like particles up to the size and weight of a complete bit, without such recovered particles being drawn off by the magnetism of the casing or the casing itself being dragged up.

A further object of the invention is to provide a fishing tool with a shielded permanent type magnet.

A further object of the invention is to provide a fishing tool with a powerful new type of magnet, guarded against damage and supported in a novel way.

A still further object of the invention is to provide a magnetic fishing tool of simple, sturdy and compact form, that can be run in and withdrawn quickly with a rope cable, is efficient and reliable in use and can be manufactured at reasonable cost.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is an elevation of the assembled fishing tool;

Figure 2 is an enlarged vertical section through the upper portion of the tool comprising the cable, mandrel and cable head socket;

Figure 3 is a similarly enlarged vertical section through the lower portion of the tool comprising the sub, shell and magnet; and Figure 4 is a bottom plan view on the same enlarged scale.

In constructing this highly efficient recovery implement or fishing tool, consideration has been given to the speed at which it can be lowered into and withdrawn from a deep well or drill hole, the strength of the magnet together with the shielding of it in a non-magnetic case, and above all the protection of the drill hole against the further and positively complete loss that could result if parts of this extremely hard-glass-like and brittle magnet became lodged therein.

Suitable for use in any size of hole from a one inch shot hole in hard rock mines up to twenty-four inch cable tool drilled holes, with the parts made to desired diameter and the weight of the tool and strength of the magnet to suit the conditions encountered, I have shown and now describe a tool especially proportioned for a deep oil well rotary drilled hole of approximately seven inches in diameter, allowing an exposed magnet face of about four inches in diameter and with adequate lifting capacity to raise even a complete bit that in this size of hole runs about sixty-seven pounds.

A wire line rope or cable 1, preferred to rod or pipe, is shown with its end bushed out or deer-tailed into a cone-recessed soft steel mandrel 2 and securely anchored therein by solid babbitting or zinc filling 3. This mandrel 2 is held in a tubular rope socket 4 at the upper end of the bore 5 therein from the upper end of which a co-axial cable passing bore 6 of reduced diameter extends through the neck 7 of the socket 4 of the top thereof. The lower end of the socket has an interiorly threaded and tapered bore 8 into which a correspondingly tapered and threaded pin 9 on the upper end of a protecting solid bronze sub 10 is screwed. This sub 10 has on its lower end a pin 11 of reduced diameter and exteriorly provided with a fine thread 12 for the reception of a hollow bronze sleeve 13 interiorly threaded as at 14 at its upper end for the reception of said pin 11.

Though the rope socket 4, solid bronze sub 10 and the hollow sleeve 13 are preferably axially aligned and of the same exterior diameter, the hollow sleeve 13 is interiorly tapered toward the bottom 15 where the open end is of reduced interior diameter. This hollow and interiorly tapered bronze sleeve with its open lower end contains a permanent magnet 16, correspondingly tapered throughout its length to fit snugly in the hollow of the sleeve in gravity-wedging relation so that it is suspended in the sleeve with support spread evenly over its entire tapered surface, and provided with a concavity 17 centrally of its lower exposed face.

The sleeve 13 serves, in addition to a novel and essentially new type of self wedging support for carrying the gravity-nested magnet, as a protective casing for the magnet at all times whether in service in a drill hole or in transit or storage. Such care is necessary in view of the particular nature of the permanent magnet 16 that is explained hereafter. Furthermore, the bronze sleeve is non-magnetic to offset the drag of the well casing that becomes highly magnetized with the day-after-day operation of the drill.

The magnet 16 is a tapered, rod-like casting, without drilling or machining of any kind, composed of an aluminum alloy known commercially as "Alnico #5" 8 Al; 14 Ni; 24 Co; 3 Cu; bal. Fe. It is capable of taking an intensely high permanent magnetism, is glass-hard and extremely brittle; machined or drilled it could fracture easily and if not supported in such a protective manner as above set forth would prove too hazardous for use in a fish tool for if broken, lost or embedded in a drill hole, could well compel the abandonment thereof entailing a financial loss. This tapered bronze shell casing, snugly embracing and securely supporting such a fragile non-drilled and non-machined casting, is of critical importance in providing the necessary security. In jobs where flushing of the hole with drilling fluid to uncover lost or broken parts of bits is desired, the necessary bore in the magnet should be brass bushed and, additional to the sub and/or socket being likewise hollow or bored, provision would be made to couple to pipe of the size used in the particular drilling job.

Because this tool permits of such relatively easy and rapid recovery of metallic fragments from a drill hole, is so simple to transport, set up and operate, and requires no special equipment, one may conveniently be carried in every rig a drilling contractor has in operation.

From the foregoing description taken in connection with the accompanying drawings, it will be manifest that a deep well fishing tool is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. A fishing tool comprising a cable suspendable body, a magnet, and a separate sleeve-like member with an open bottom, encircling said magnet and connecting said magnet to said body, said magnet being a rod tapered throughout its length and said sleeve-like member being interiorly tapered to said open bottom, whereby said tapered magnet nests by gravity in snug-fitting relation in said interiorly tapered member and is suspended by the same with support over its entire tapered surface.

2. A fishing tool comprising a cable suspendable body, a permanently magnetized, elongated and tapered magnet, and a correspondingly tapered sleeve surrounding and protectively supporting said tapered magnetized casting in gravity-wedging relation, snugly nested therein, and removably attached to said cable suspendable body.

3. A fishing tool comprising a cable suspendable body, a permanent magnet consisting of an intensely magnetized, extremely hard and brittle aluminum alloy in the form of an elongated tapered rod, and a separable, sleeve-like open bottom guard interiorly tapered to said open bottom surrounding and snugly embracing said magnet that is suspended therein in gravity-wedging relation, said guard being connected to said cable suspendable body.

4. An oil well fishing tool comprising a cable suspendable body; a hollow bronze sleeve threadedly connected on the lower end of said body, said sleeve being interiorly tapered throughout its length to an open bottom of reduced interior diameter; and a brittle cast magnet correspondingly tapered throughout its length and fitting snugly in the hollow of said sleeve, said magnet being securely and protectively supported thereby, and with its reduced lower end exposed in the open bottom of said sleeve.

HERBERT COOK.

References Cited in the file of this patent

UNITED STATES PATENTS

| Number | Name | Date |
|---|---|---|
| 512,381 | Keyes | Jan. 9, 1894 |
| 710,615 | Robertson | Oct. 7, 1902 |
| 1,094,106 | White | Apr. 21, 1914 |
| 1,306,637 | Shafer | June 10, 1919 |
| 1,539,891 | Wood | June 2, 1925 |
| 2,092,316 | Lane | Sept. 7, 1937 |
| 2,166,024 | Schmidt | July 11, 1939 |
| 2,431,361 | Athy | Nov. 25, 1947 |
| 2,471,764 | Miller et al. | May 31, 1949 |
| 2,517,325 | Lamb | Aug. 1, 1950 |

FOREIGN PATENTS

| Number | Country | Date |
|---|---|---|
| 407,999 | Great Britain | Mar. 29, 1934 |

OTHER REFERENCES

Permanent Magnet Manual #3, The Indiana Steel Products Company, Copyright 1945, pgs. 18 and 35.